(12) United States Patent
Morris

(10) Patent No.: US 8,255,825 B2
(45) Date of Patent: Aug. 28, 2012

(54) CONTENT AWARE ADAPTIVE DISPLAY

(75) Inventor: Ronald A. Morris, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 12/246,804

(22) Filed: Oct. 7, 2008

(65) Prior Publication Data

US 2010/0088630 A1     Apr. 8, 2010

(51) Int. Cl.
*G06F 3/048* (2006.01)
(52) U.S. Cl. ........................ 715/781; 715/862
(58) Field of Classification Search .................... 715/781
See application file for complete search history.

(56) References Cited

U.S. PATENT DOCUMENTS

| | | | |
|---|---|---|---|
| 6,148,149 A | 11/2000 | Kagle | |
| 7,054,552 B2 | 5/2006 | Konttinen | |
| 7,310,513 B2 | 12/2007 | Bulthuis et al. | |
| 7,345,671 B2 | 3/2008 | Robbin et al. | |
| 7,400,915 B2 | 7/2008 | Wong et al. | |
| 2007/0217716 A1* | 9/2007 | Marriott et al. | 382/305 |
| 2008/0052945 A1* | 3/2008 | Matas et al. | 34/173 |
| 2008/0079689 A1 | 4/2008 | Koskinen | |
| 2008/0088602 A1 | 4/2008 | Hotelling | |
| 2008/0172695 A1 | 7/2008 | Migos et al. | |
| 2009/0002335 A1* | 1/2009 | Chaudhri | 345/173 |
| 2009/0237325 A1* | 9/2009 | Luo et al. | 345/2.1 |
| 2010/0280931 A1* | 11/2010 | Lim et al. | 705/34 |
| 2010/0302408 A1* | 12/2010 | Ito | 348/231.99 |

OTHER PUBLICATIONS

Schmidt, et al., "There is more to Context than Location", Retrieved at <<http://www.teco.edu/~albrecht/publication/draft_docs/context-is-more-than-location.pdf>>, pp. 1-10.
Shen, et al., "MobiUS: Enable Together-Viewing Video Experience across Two Mobile Devices", MobiSys'07, Jun. 11-14, 2007, Retrieved at <<http://www.usenix.org/events/mobisys07/full_papers/p30.pdf>>, pp. 30-42.
Luyten, et al., "Imogl: Take Control over a Context-Aware Electronic Mobile Guide for Museums", Retrieved at <<http://citeseer.ist.psu.edu/cache/papers/cs2/688/http:zSzzSzresearch.edm.luc.ac.bezSz~kriszSzresearchzSzpublicationszSzmguides2004zSzluytenconinx-imogi-mobileguides.pdf/luyten04imogi.pdf>>, pp. 6.
Pears, et al., "Display Registration for Device Interaction: A Proof of Principle Prototype", Retrieved at <<http://www-users.cs.york.ac.uk/nep/research/dispreg/visapp08_115.pdf>>, pp. 6.

* cited by examiner

*Primary Examiner* — William Bashore
*Assistant Examiner* — Hien Duong
(74) *Attorney, Agent, or Firm* — Wolfe-SBMC

(57) ABSTRACT

Content aware adaptive display is described. In embodiment(s), a media image can be displayed on an integrated display of a media device. The media device can detect that a display device is proximate the media device, determine a display orientation for the media image at the display device, and communicate the media image to the display device that then displays the media image in the determined display orientation.

16 Claims, 4 Drawing Sheets

CONTENT AWARE ADAPTIVE DISPLAY

BACKGROUND

Various media devices, such as televisions, personal media players, mobile phones, portable media devices, computer devices, and the like can all have the capability to acquire and playback or render movies, television programs, photos, data feeds, and/or music from various private and public networks, as well as from proprietary marketplaces. Media devices are increasingly used for not only communication, but to store different types of information and data, such as personal and business information, documents, pictures, and other types of data. It is increasingly commonplace to find more video content, music videos, and images that can be viewed on almost any media device that has a display screen.

Some newer media devices have integrated display screens capable of widescreen display for modern video content. In addition, these devices are designed to be held in both vertical or horizontal positions. Media content can be displayed in a vertical position and then rotated to be displayed in a horizontal position when the device is rotated. However, media content that displays well in the vertical position often does not display well in the horizontal position, and vice-versa.

SUMMARY

This summary is provided to introduce simplified concepts of content aware adaptive display. The simplified concepts are further described below in the Detailed Description. This summary is not intended to identify essential features of the claimed subject matter, nor is it intended for use in determining the scope of the claimed subject matter.

Content aware adaptive display is described. In embodiment(s), a media image can be displayed on an integrated display of a media device. The media device can detect that a display device is proximate the media device, determine a display orientation for the media image at the display device, and communicate the media image to the display device that then displays the media image in the determined display orientation.

In other embodiment(s) of content aware adaptive display, the media device can determine an aspect ratio of the display device that is proximate, determine a version of the media image that corresponds to the aspect ratio of the display device, and then communicate the version of the media image to the display device that displays the version of the media image in the aspect ratio of the display device. The media device can also determine a version of the media image that corresponds to a content type that can be displayed by the display device, and then communicate the version of the media image to the display device that displays the media image of the content type. The media image can be displayed at the display device as a full-screen image while the media device is rotated and/or while the integrated display of the media device changes. For example, the media device can detect a rotated position of the integrated display of the media device, determine media content that is associated with the media image, and display the media content on the integrated display of the media device in the rotated position.

In other embodiment(s) of content aware adaptive display, the media device can detect that an additional media device is proximate the media device, and communicate media content that is associated with the media image to the additional media device that displays the media content. The media device can establish a parent-child relationship with the additional media device, and then display a different media image on the integrated display of the media device based on the display of the media content at the additional media device. In an embodiment, the media device can control what is displayed at the additional media device.

In other embodiment(s) of content aware adaptive display, media content can be displayed on the integrated display of the media device. The media device can detect that a display device is proximate the media device and then communicate the media content to the display device that displays the media content. The media device can detect a rotated position of the integrated display, determine a media image that is associated with the media content, and display the media image on the integrated display of the media device in the rotated position. In an example, the media content is initially displayed on the integrated display of the media device as a list view of media images in a vertical display orientation. The media image is then displayed on the integrated display of the media device as a full-screen image in a horizontal display orientation of the media device.

BRIEF DESCRIPTION OF THE DRAWINGS

Embodiments of content aware adaptive display are described with reference to the following drawings. The same numbers are used throughout the drawings to reference like features and components.

DETAILED DESCRIPTION

Embodiments of content aware adaptive display provide that two or more devices in proximate location to one another can communicate to display media images in various display orientations while taking into account the aspect ratio of a display device and the type of content to be displayed by a device. A media image can be displayed on a display device and/or on an integrated display of a media device as a full-screen display, as a thumbnail image along with other media images, and/or in a list view with other associated media images or media content. When a media image is displayed on an integrated display of a media device as a full-size image, and the device is rotated, the media device can determine that the media image would be more suited for display as a thumbnail image, or in a list view with other media images. When two devices are proximate in location and media images are displayed on a display device, a proximate media device can control what is displayed on the display device.

While features and concepts of the described systems and methods for content aware adaptive display can be implemented in any number of different environments, systems, and/or various configurations, embodiments of content aware adaptive display are described in the context of the following example systems and environments.

Figure 1:
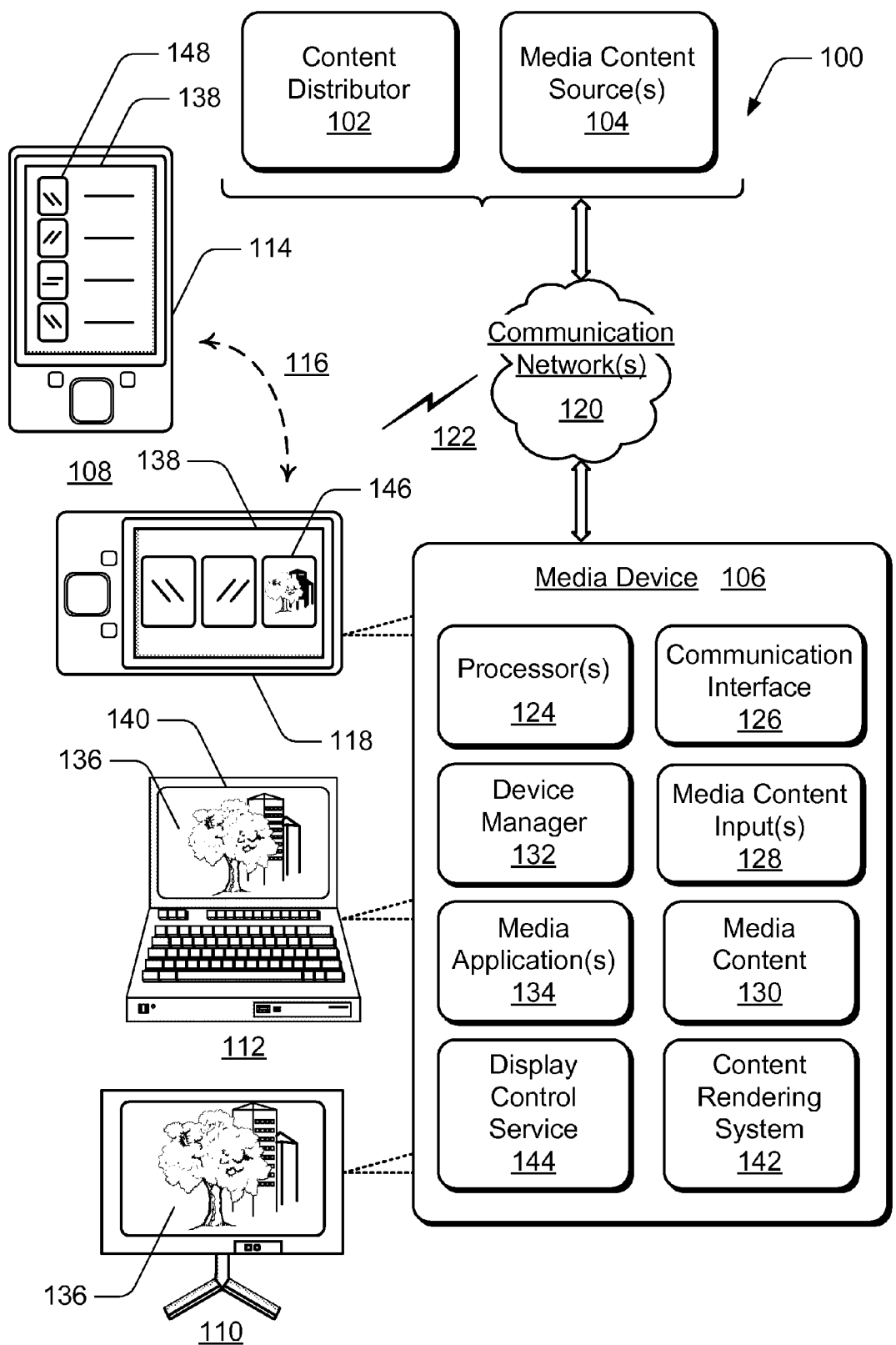
FIG. 1 illustrates an example system in which embodiments of content aware adaptive display can be implemented.

FIG. 1 illustrates an example system 100 in which various embodiments of content aware adaptive display can be implemented. Example system 100 includes a content distributor 102, other media content source(s) 104, and a media device 106 that can be implemented to receive media content from the content distributor 102 and/or any other media content source 104. The media device 106 (e.g., a wired and/or wireless device) can be implemented as any type of portable media device 108 (e.g., a personal media player, portable media player, etc.), an independent display device 110 (e.g., a passive display device), a television client device (e.g., a television set-top box, a digital video recorder (DVR), etc.), a computer device, a portable computer device 112, a gaming system, an appliance device, an electronic device, and/or as any other type of media device that can be implemented to receive and display or otherwise output media content in any form of audio, video, and/or image data.

The portable media device 108 can include a vertical display orientation 114 and can be rotated 116 to a horizontal display orientation 118. A wireless and/or portable media device can include any type of device implemented to receive and/or communicate wireless data, messaging data, and/or voice communications, such as any one or combination of a mobile phone (e.g., cellular, VoIP, WiFi, etc.), a portable computer device, a portable media player, and/or any other wireless media device that can receive media content in any form of audio, video, and/or image data.

The display device 110 can be implemented as any type of a television, high definition television (HDTV), LCD, or similar display system. Display device 110 can be an independent, ambient, or otherwise passive display that may not be monitored or viewed with constant attention, such as for video projection at a music event, an informational board in a public space, or other large or small display device that displays passive information for viewing when the displayed content is of interest to a viewer. Once initiated, the output of a media application can continue to be displayed for any viewer in a public, private, office, or home environment.

Any of the media devices described herein can be implemented with one or more processors, communication components, media content inputs, memory components, storage media, signal processing and control circuits, and a media content rendering system. A media device can also be implemented with any number and combination of differing components as described with reference to the example device shown in FIG. 4. A media device may also be associated with a user or viewer (i.e., a person) and/or an entity that operates the device such that a media device describes logical devices that include users, software, and/or a combination of devices.

The example system 100 includes content distributor 102 and/or the other media content source(s) 104 that distribute media content to the media devices. In a television distribution system, a television content distributor facilitates distribution of television media content, content metadata, and/or other associated data to multiple viewers, users, customers, subscribers, viewing systems, and/or client devices. Media content (e.g., to include recorded media content) can include any type of audio, video, and/or image media content received from any media content source. As described herein, media content can include television media content, television programs (or programming), advertisements, commercials, music, movies, video clips, data feeds, and on-demand media content. Other media content can include interactive games, network-based applications, and any other content (e.g., to include program guide application data, user interface data, advertising content, closed captions data, content metadata, search results and/or recommendations, and the like).

The media devices and the sources that distribute media content can all be implemented for communication via communication network(s) 120 that can include any type of a data network, voice network, broadcast network, an IP-based network, and/or a wireless network 122 that facilitates data and/or voice communications. The communication network(s) 120 and wireless network 122 can be implemented using any type of network topology and/or communication protocol, and can be represented or otherwise implemented as a combination of two or more networks. Any one or more of the arrowed communication links facilitate two-way data communication, such as from the content distributor 102 to the media device 106 and vice-versa.

In this example system 100, media device 106 includes one or more processors 124 (e.g., any of microprocessors, controllers, and the like), a communication interface 126 for data, messaging, and/or voice communications, and media content input(s) 128 to receive media content 130. Media device 106 also includes a device manager 132 (e.g., a control application, software application, signal processing and control module, code that is native to a particular device, a hardware abstraction layer for a particular device, etc.).

Media device 106 can include various media applications 134 that that can be processed, or otherwise executed, by the processors 124 to generate media images 136 for display on display device 110, or on an integrated display 138 of the portable media device 108 and/or on an integrated display 140 of the portable computer device 112. Media device 106 includes a content rendering system 142 that can render the media images 136 from the media applications 134 to generate a display on any of the media devices. Media device 106 also includes a display control service 144 that can be implemented as computer-executable instructions and executed by the processors 124 to implement various embodiments and/or features of content aware adaptive display. In an embodiment, the display control service 144 can be implemented as a component or module of the device manager 132.

The portable media device 108 includes integrated display 138 that can display a media image as a full-screen image, display a media image as a thumbnail image 146 with additional media images (e.g., shown in the horizontal display orientation 118 in this example), and/or display a media image as media content 148 that is associated with the media image and displayed on the integrated display 138 in a list view with the additional media images (e.g., shown in the vertical display orientation 114). In an embodiment, the display control service 144 can be implemented to detect a rotated position of integrated display 138 on media device 108. For example, the display control service 144 can detect when the portable media device 108 is rotated 116 from the horizontal display orientation 118 to the vertical display orientation 114. When the device is rotated, the display control service 144 can determine the media content 148 (e.g., shown in the list view) that is associated with the media image 136, and initiate the media content 148 being displayed on the integrated display 138 in the rotated position. When the device is rotated 116, the integrated display 138 changes from the array of thumbnail images 146 to the list view of the associated media content 148.

In various embodiments, the display control service 144 in a media device 108 can detect that display device 110 is proximate the media device. The display control service 144 can then determine a display orientation for the media image 136 to be displayed on the display device 110, and initiate communication of the media image 136 to the display device that displays the media image in the determined display orientation (e.g., as a full-screen image in this example). When two or more devices are proximate in location, the display control service 144 can determine how to display a media image, taking into account the aspect ratio of the display device, scaling the media image for display, and the type of media content that the display device is capable of displaying. The display control service 144 in a media device can initiate communication of a media image to another media device in a version of the media image that the media device can display in a particular aspect ratio, or in a version of the media image that corresponds to a content type that can be displayed by the media device.

In other embodiments, the display control service 144 in media device 108 can detect that another media device, such as portable computer device 112, is proximate in location, and communicate media content 148 that is associated with the media image 136 to the portable computer device 112 that displays the media content. The media device 108 can establish a parent-child relationship with the portable computer device 112, and control what is displayed at the computer device. The display control service 144 can also initiate a different media image being displayed on the integrated display 138 based on the display of the media content at the additional media device. In a parent-child relationship, two media devices 106 can be utilized for a business presentation, as a gaming system, or for other user interactive scenarios.

In other embodiments, the display control service 144 in a media device 106 can detect a rotation of the media device within the proximity of another media device, such as portable computer device 112. The portable media device 108 may be better suited to display a full-screen media image when rotated in the horizontal display orientation 118, whereas the portable computer device 112 may be better suited to display a menu (e.g., a list view of media content) from which media images can be selected.

Example methods 200 and 300 are described with reference to respective FIGS. 2 and 3 in accordance with one or more embodiments of content aware adaptive display. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. Example methods 200 and 300 may be described in the general context of computer-executable instructions, which can include software, applications, routines, programs, objects, components, data structures, procedures, modules, functions, and the like.

The method(s) may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 2:
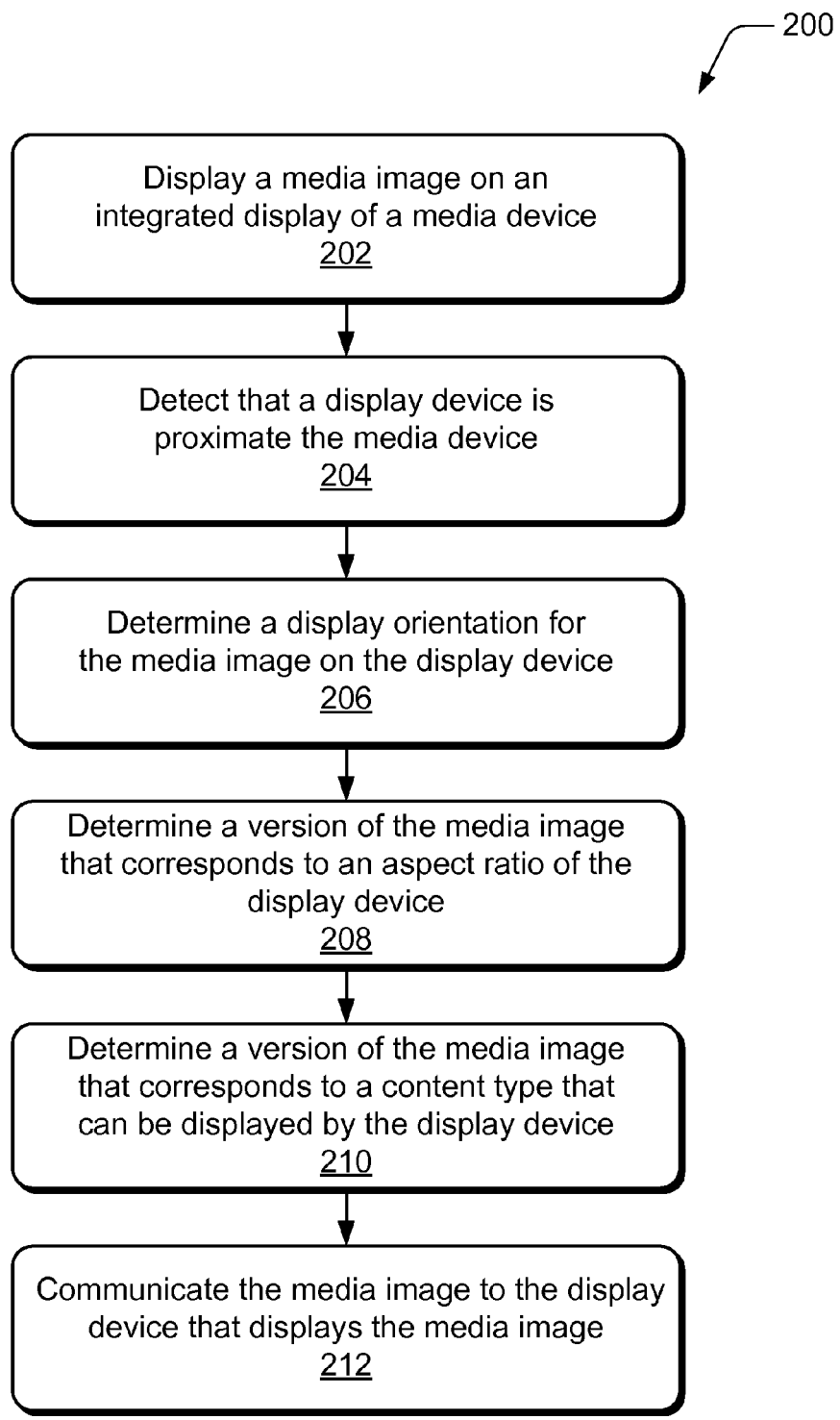
FIG. 2 illustrates example method(s) for content aware adaptive display in accordance with one or more embodiments.

FIG. 2 illustrates example method(s) 200 of content aware adaptive display. The order in which the method is described is not intended to be construed as a limitation, and any number of the described method blocks can be combined in any order to implement the method, or an alternate method.

At block 202, a media image is displayed on an integrated display of a media device. For example, media image 136 is displayed as a full-screen image on display device 110 and on the integrated display of portable computer device 112. A media image can also be displayed as a thumbnail image 146, such as on the integrated display 138 of the portable media device 108 in the horizontal display orientation 118, or displayed as media content 148 in a list view on the integrated display 138 of the portable media device 108 in the vertical display orientation 114.

At block 204, a display device is detected as being proximate the media device. For example, the display control service 144 at a media device 106 detects when display device 110 and/or another media device (e.g., portable computer device 112) is proximate in location, such as via device communications. At block 206, a display orientation for the media image is determined. For example, the display control service 144 at a media device 106 determines a display orientation for the media image 136 to be displayed on the display device 110.

At block 208, a version of the media image that corresponds to an aspect ratio of the display device is determined and, at block 210, a version of the media image that corresponds to a content type that can be displayed by the display device is determined. For example, the display control service 144 at a media device 106 determines a version of the media image 136 that corresponds to an aspect ratio of the display device 110, and determines a version of the media image 136 that corresponds to a content type that can be displayed by the display device 110. When two or more devices are proximate in location, the display control service 144 determines how to display a media image, taking into account the aspect ratio of the display device, scaling the media image for display, and the type of media content that the display device is capable of displaying.

At block 212, the media image is communicated to the display device that displays the media image. For example, the display control service 144 at a media device 106 initiates communication of a media image 136 to display device 110 that displays the media image in the determined display orientation, in the version of the media image in the aspect ratio of the display device, and/or in the media image of the content type.

Figure 3:
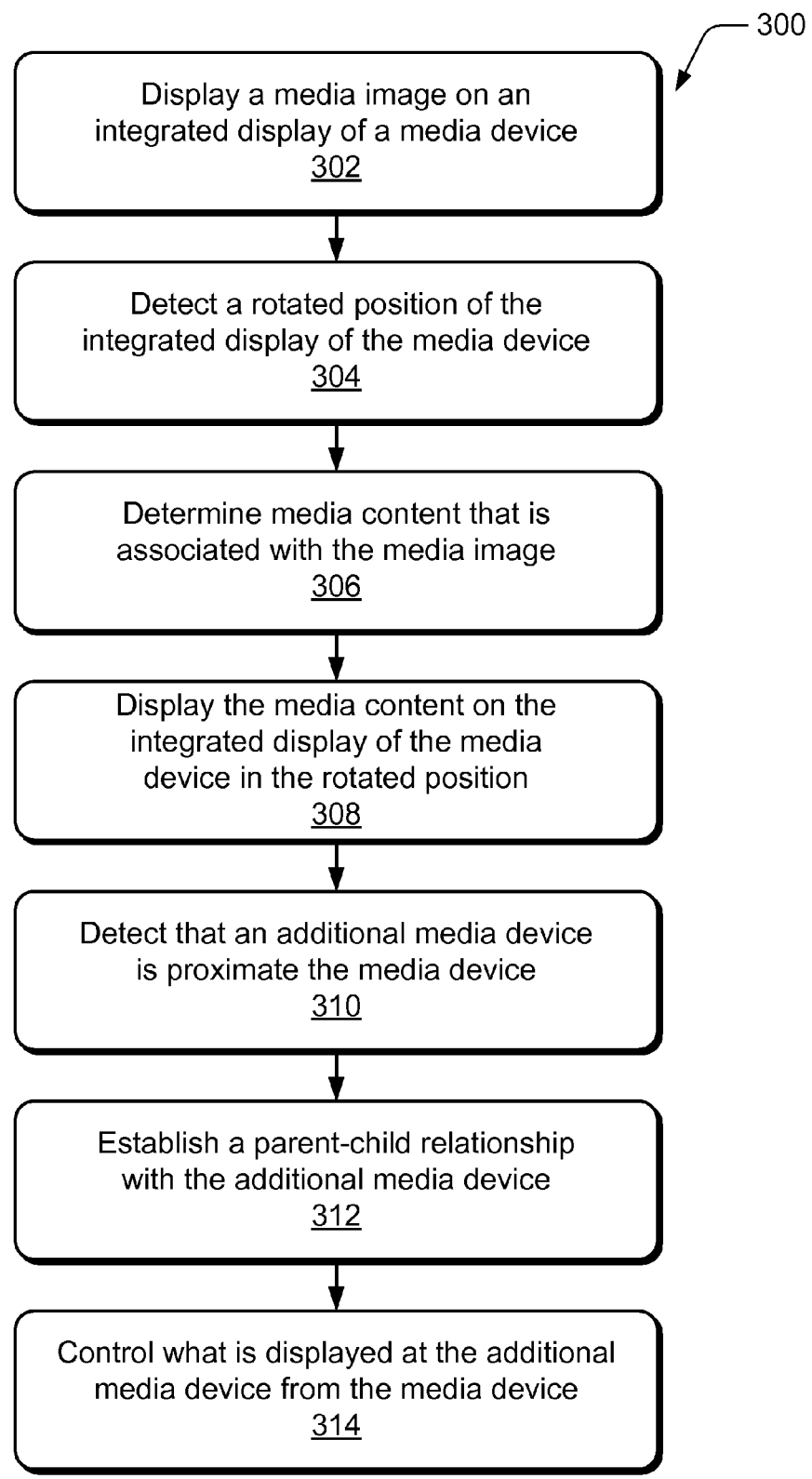
FIG. 3 illustrates example method(s) for content aware adaptive display in accordance with one or more embodiments.

FIG. 3 illustrates example method(s) 300 of content aware adaptive display. The order in which the method is described is not intended to be construed as a limitation, and any number of the described method blocks can be combined in any order to implement the method, or an alternate method.

At block 302, a media image is displayed on an integrated display of a media device. For example, media image 136 is displayed as a full-screen image on display device 110 and on the integrated display of portable computer device 112. A media image can also be displayed as a thumbnail image 146, such as on the integrated display 138 of the portable media device 108 in the horizontal display orientation 118, or displayed as media content 148 in a list view on the integrated display 138 of the portable media device 108 in the vertical display orientation 114.

At block 304, a rotated position of the integrated display of the media device is detected. For example, the display control service 144 at media device 108 detects a rotated position of integrated display 138 on media device 108, such as when the portable media device 108 is rotated 116 from the horizontal display orientation 118 to the vertical display orientation 114.

At block 306, media content that is associated with the media image is determined and, at block 308, the media content is displayed on the integrated display of the media device in the rotated position. For example, the display control service 144 in portable media device 108 determines the media content 148 (e.g., shown in the list view) that is associated with the media image 146, and initiates the media content 148 being displayed on the integrated display 138 in the rotated position.

At block 310, an additional media device is detected as being proximate the media device. For example, the display control service 144 at media device 106 can detect when display device 110 and/or another media device (e.g., portable computer device 112) is proximate in location, such as via device communications.

At block 312, a parent-child relationship is established with the additional media device and, at block 314, the media content that is displayed at the additional media device is controlled from the media device. For example, media device 108 can establish a parent-child relationship with the additional media device (e.g., portable computer device 112), and control what is displayed at the computer device. In addition, a different media image is displayed on the integrated display of the media device based on the display of the media content at the additional media device.

Figure 4:
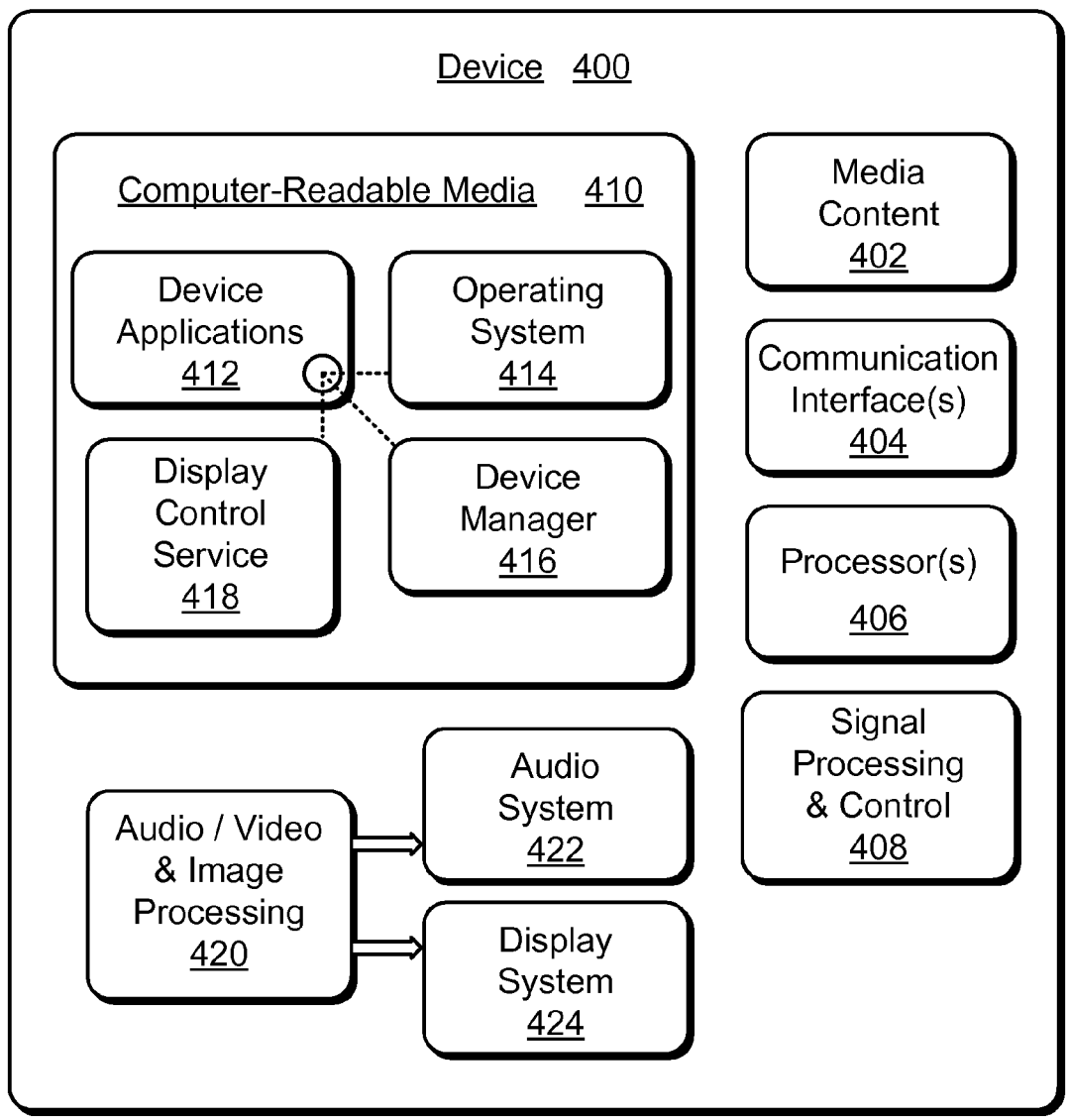
FIG. 4 illustrates various components of an example device that can implement embodiments of content aware adaptive display.

FIG. 4 illustrates various components of an example device 400 that can be implemented as any form of a mobile communication, computing, electronic, and/or media device to implement various embodiments of content aware adaptive display. For example, device 400 can be implemented as a media device as shown in FIG. 1.

Device 400 includes media content 402 and one or more communication interfaces 404 that can be implemented for any type of data and/or voice communication via communication network(s). Device 400 also includes one or more processors 406 (e.g., any of microprocessors, controllers, and the like) which process various computer-executable instructions to control the operation of device 400, and to implement embodiments of content aware adaptive display. Alternatively or in addition, device 400 can be implemented with any one or combination of hardware, firmware, or fixed logic circuitry that is implemented in connection with signal processing and control circuits which are generally identified at 408.

Device 400 also includes computer-readable media 410, such as any suitable electronic data storage or memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like.

Computer-readable media 410 provides data storage mechanisms to store the media content 402, as well as various device applications 412 and any other types of information and/or data related to operational aspects of device 400. For example, an operating system 414 can be maintained as a computer application with the computer-readable media 410 and executed on the processors 406. The device applications 412 can also include a device manager 416, a display control service 418, and various media applications. In this example, the device applications 412 are shown as software modules and/or computer applications that can implement various embodiments of content aware adaptive display as described herein.

Device 400 can also include an audio, video, and/or image processing system 420 that provides audio data to an audio rendering system 422 and/or provides video or image data to an external or integrated display system 424. The audio rendering system 422 and/or the display system 424 can include any devices or components that process, display, and/or otherwise render audio, video, and image data. In an implementation, the audio rendering system 422 and/or the display system 424 can be implemented as integrated components of the example device 400. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Although embodiments of content aware adaptive display have been described in language specific to features and/or methods, it is to be understood that the subject of the appended claims is not necessarily limited to the specific features or methods described. Rather, the specific features and methods are disclosed as example implementations of content aware adaptive display.

The invention claimed is:

1. A method, comprising:
   displaying a media image on an integrated display of a media device;
   detecting that a display device is proximate in location to the media device;
   determining a display orientation for the media image;
   communicating the media image to the display device that displays the media image in the determined display orientation;
   detecting that an additional media device is proximate in location to the media device;
   communicating media content that is associated with the media image to the additional media device that displays the media content;
   establishing a parent-child relationship with the additional media device to control what is displayed at the additional media device;
   displaying an additional media image on the integrated display of the media device, the additional media image being a different image than the media image, and the additional media image associated with the media content;
   detecting a rotated position of the integrated display of the media device; and
   displaying the media content in place of the media image on the integrated display of the media device in the rotated position responsive to detecting the rotated position of the integrated display.

2. A method as recited in claim 1, further comprising:
   determining a version of the media image that corresponds to an aspect ratio of the display device; and
   communicating the version of the media image to the display device that displays the version of the media image in the aspect ratio of the display device.

3. A method as recited in claim 1, further comprising:
   determining a version of the media image that corresponds to a content type that can be displayed by the display device; and
   communicating the version of the media image to the display device that displays the media image of the content type.

4. A method as recited in claim 1, wherein:
   the media image is displayed on the integrated display of the media device as a thumbnail image with additional media images in a horizontal display orientation;
   the media content that is associated with the media image is displayed on the integrated display of the media device as a list view of the additional media images in a vertical display orientation; and wherein
   the media image is displayed at the display device as a full-screen image.

5. A method as recited in claim 1, further comprising controlling what is displayed at the additional media device from the media device.

6. A method, comprising:
displaying media content on an integrated display of a media device;
detecting that a display device is proximate in location to the media device;
communicating the media content to the display device that displays the media content;
detecting that an additional media device is proximate in location to the media device;
establishing a parent-child relationship with the additional media device to control what is displayed at the additional media device;
communicating additional media content to the additional media device that displays the additional media content, the additional media content being different viewable content than the media content;
detecting a rotated position of the integrated display of the media device; and responsive to detecting the rotated position of the integrated display of the media device:
determining a media image that is associated with the media content; and
displaying the media image on the integrated display of the media device in the rotated position in place of the media content.

7. A method as recited in claim 6, wherein:
the media content is displayed on the integrated display of the media device as a list view of media images in a vertical display orientation of the media device; and
the media image is displayed on the integrated display of the media device as a full-screen image in a horizontal display orientation of the media device.

8. A method as recited in claim 6, further comprising controlling what is displayed on the display device from the media device.

9. A method as recited in claim 6, further comprising:
determining a version of the media content that corresponds to an aspect ratio of the display device; and
communicating the version of the media content to the display device that displays the version of the media content in the aspect ratio of the display device.

10. A method as recited in claim 6, further comprising:
determining a version of the media content that corresponds to a content type of the media content; and
communicating the version of the media content to the display device that displays the content type of the media content.

11. A media device, comprising:
an integrated display configured to display a media image;
a display control service configured to:
detect that a display device is located proximate the media device;
determine a display orientation for the media image;
initiate communication of the media image to the display device that displays the media image in the determined display orientation;
detect that an additional media device is proximate the media device;
communicate media content that is associated with the media image to the additional media device that displays the media content;
establish a parent-child relationship with the additional media device to control what is displayed at the additional media device;
initiate an additional media image being displayed on the integrated display of the media device, the additional media image being a different image than the media image, and the additional media image associated with the media content;
detect a rotated position of the integrated display; and
initiate the media content being displayed on the integrated display in the rotated position in place of the media image responsive to detection of the rotated position.

12. A media device as recited in claim 11, wherein the display control service is further configured to:
determine a version of the media image that corresponds to an aspect ratio of the display device; and
initiate communication of the version of the media image to the display device that displays the version of the media image in the aspect ratio of the display device.

13. A media device as recited in claim 12, wherein the display control service is further configured to determine the aspect ratio of the display device.

14. A media device as recited in claim 11, wherein the display control service is further configured to:
determine a version of the media image that corresponds to a content type that can be displayed by the display device; and
initiate communication of the version of the media image to the display device that displays the media image of the content type.

15. A media device as recited in claim 11, wherein:
the media image is displayed on the integrated display as a thumbnail image with additional media images in a horizontal display orientation;
the media content that is associated with the media image is displayed on the integrated display as a list view of the additional media images in a vertical display orientation; and wherein
the media image is displayed at the display device as a full-screen image.

16. A media device as recited in claim 11, wherein the display control service is further configured to control what is displayed at the additional media device.

* * * * *